United States Patent [19]
Glaser

[11] Patent Number: 4,863,323
[45] Date of Patent: Sep. 5, 1989

[54] CHANGING AND CHUCKING TOOL

[75] Inventor: Franz Glaser, Nuernberg, Fed. Rep. of Germany

[73] Assignee: Hertel AG Werkzeuge+Hartstoffe, Fuerth, Fed. Rep. of Germany

[21] Appl. No.: 254,631

[22] Filed: Oct. 7, 1988

[30] Foreign Application Priority Data

Oct. 8, 1987 [DE] Fed. Rep. of Germany ....... 3734052

[51] Int. Cl.⁴ .......................... B23C 5/26; B23B 31/00
[52] U.S. Cl. .................................. 409/232; 279/2 R; 408/239 R
[58] Field of Search ........................ 409/232, 233, 234; 408/239 R; 279/2 R, 79; 403/325

[56] References Cited

U.S. PATENT DOCUMENTS

| | | | |
|---|---|---|---|
| 2,987,334 | 6/1961 | Wendling | 279/79 |
| 3,469,871 | 9/1969 | Betts | 403/325 |
| 4,322,190 | 3/1982 | Anderson | 409/234 |
| 4,350,463 | 9/1982 | Friedline | 409/234 |
| 4,680,999 | 7/1987 | Kojima et al. | 409/233 X |
| 4,708,040 | 11/1987 | Erickson | 409/233 X |
| 4,715,753 | 12/1987 | Tack | 409/234 |
| 4,740,122 | 4/1988 | Glaser | 409/232 |
| 4,747,735 | 5/1988 | Erickson et al. | 409/234 |
| 4,785,542 | 11/1988 | Tack et al. | 409/234 |

FOREIGN PATENT DOCUMENTS

| | | |
|---|---|---|
| 0185842 | 8/1985 | European Pat. Off. . |
| 0224770 | 6/1987 | European Pat. Off. . |
| 1752833 | 5/1968 | Fed. Rep. of Germany . |
| 2360337 | 6/1975 | Fed. Rep. of Germany . |
| 2936639 | 6/1980 | Fed. Rep. of Germany . |
| 3524739 | 2/1986 | Fed. Rep. of Germany . |
| 2252891 | 6/1975 | France . |
| 507412 | 4/1976 | U.S.S.R. ............................ 409/234 |
| 2154479 | 9/1985 | United Kingdom . |
| 2163379 | 2/1986 | United Kingdom . |

OTHER PUBLICATIONS

PCT, WO85/03467, 8/85.

Primary Examiner—William Briggs
Attorney, Agent, or Firm—Spencer & Frank

[57] ABSTRACT

An apparatus to change and chuck a tool head incorporates a chucking system that is arranged in a recess in the drive spindle that chucks a tool-head shank that can be inserted into the accommodating opening. The chucking system incorporates a grip with an axially displaceable spreader and radial guide drillings that accommodate lock balls. The tool-head shank is configured as an annular cylinder and provided with an inside annular groove on the inclined groove side wall of which locking elements, that are arranged on the grip and can be forced apart in a radial direction, outside the lock balls on the grip, interact with corresponding locking surfaces both in the locking direction and in the direction of spread.

19 Claims, 7 Drawing Sheets

CHANGING AND CHUCKING TOOL

The present invention relates to an apparatus for changing and chucking a tool head to the drive spindle of a machine tool.

In a known apparatus, the tool-head shank is penetrated by radial openings that accommodate and provide for the direct action of the lock balls on the tool spindle. The tool-head shaft has the peripheral form of a cone, in particular of a standard cone.

It is an object of the present invention to provide an apparatus that permits the rapid change of the tool head by, for example, a robot, and yet which is highly resistant to oscillation of the tool head that has been chucked in it and is highly resistant to wear.

According to the present invention there is provided an apparatus for changing and chucking a tool head to the drive spindle of a machine tool, with a recess provided in the face of the drive spindle, which is coaxial with the axis of rotation of the drive spindle, to accommodate a shaft of the tool head that projects in an axial direction, and with a gripper of a chucking system that can be operated from the machine-tool side, which projects centrally from the base of the recess and that has an annular space around it within the recess formed by appropriate clearance to the inner peripheral wall of the recess, the shaft of the tool head being insertable into the annular space of the spindle recess, where it can be clamped by the chucking unit, and the gripper of the chucking unit supporting a spreader that can be moved axially in the direction of the drive spindle and through which there are radial guide drillings, within each of which there is a lock ball, it being possible to spread these apart, radially outwards by an axial pull on the spreader and which tighten the tool head thereby, wherein (a) the tool-head shank is configured as a tubular body, at least in its free end area, and has an inside annular groove on its inner annular surface, which, on its machine-tool side has a groove side wall that is inclined in the manner of an inside cone and subtends an acute angle that closes in the locking direction with the axis of the drive spindle, (b) locking elements are set in the peripheral surface of the gripper, which cannot be moved in the axial direction, but which can be forced apart in the radial direction, these elements having locking surfaces that are shaped to correspond to the inside-cone shaped groove side wall of the inside annular groove as segments of an exterior cone, and (c) the lock balls lie on the inner side of a locking element such that when the lock balls are forced apart the lock elements exert both an axial inner pressure in the locking direction and a radial inner pressure in the direction of spread on the tool-head shank.

With such an arrangement, it is possible to avoid, to a very great extent, point contact between the parts that are needed for chucking. The chucking apparatus holds the tool both in the radial and axial direction, which also ensures a high degree of reproducibility in the chucking process. The distribution of pressure can be selected by the angle that the locking surface or the inside conical side wall of the inside annular groove of the tool-head shank subtends with the axis of the drive spindle. This angle can be 45°, for example.

In a preferred embodiment, it is possible to achieve a very precise fit and to minimize wear because, generally speaking, the chucking arrangement according to the invention takes advantage of the elasticity inherent in steel and the deformation of the tubular tool-head shank that takes place during the chucking process remains within its elastic range. Clamping contact between the tool-head shank and the spindle recess is released automatically when the lock balls return to their starting position.

Another preferred feature ensures that there is no need for a special return system to move the locking elements back into their radially inward starting positions. Even if the locking elements project beyond the outer periphery of the chucking head when the tool-head shank is introduced into the spindle recess, the chucking procedure is not hindered.

In one embodiment ring step of the recess in the working spindle with the corresponding annular projection of the tool-head shank ensures a fit between the recess of the working single and the tool-head shank. Because of the fact that these matching parts are positioned close to the face surface of the working spindle when in the locked state, they are at some distance from the effective area of the locking elements. For this reason, this fit area is not subjected to any of the deformation effects that result from the chucking process. Thus, a particularly close fit can be selected without detriment to operating security. The positioning of these matching parts in the front area of the spindle recess that is adjacent to the face of the drive spindle does not prevent a close fit from being achieved the change-over process. The fit lies in an area that is as close as possible to the tool cutter with a relatively short lever arm.

Further preferred features of the invention enhance the absence of deformation effects on the ring projection of the tool-head shank, the reproducibility achieved in with the axial positioning of the tool head, and contribute to the secure insertion of the tool-head shank into the spindle recess. Even if there is no precise alignment of the longitudinal axes of the tool-head shank and the working spindle, the unhindered insertion of the tool-head shank into the spindle recess is assured. In this case, the formation of sloping sides also promotes reliable guidance of the tool-head shank during the change-over process.

The invention will now be described in more detail, by way of example only, with reference to the accompanying drawings, in which.

The locking and changing system according to the present invention works between the drive spindle 1 of a machine tool, not described in greater detail herein, and a tool head that is to be clamped or chucked on this.

Figure 1:
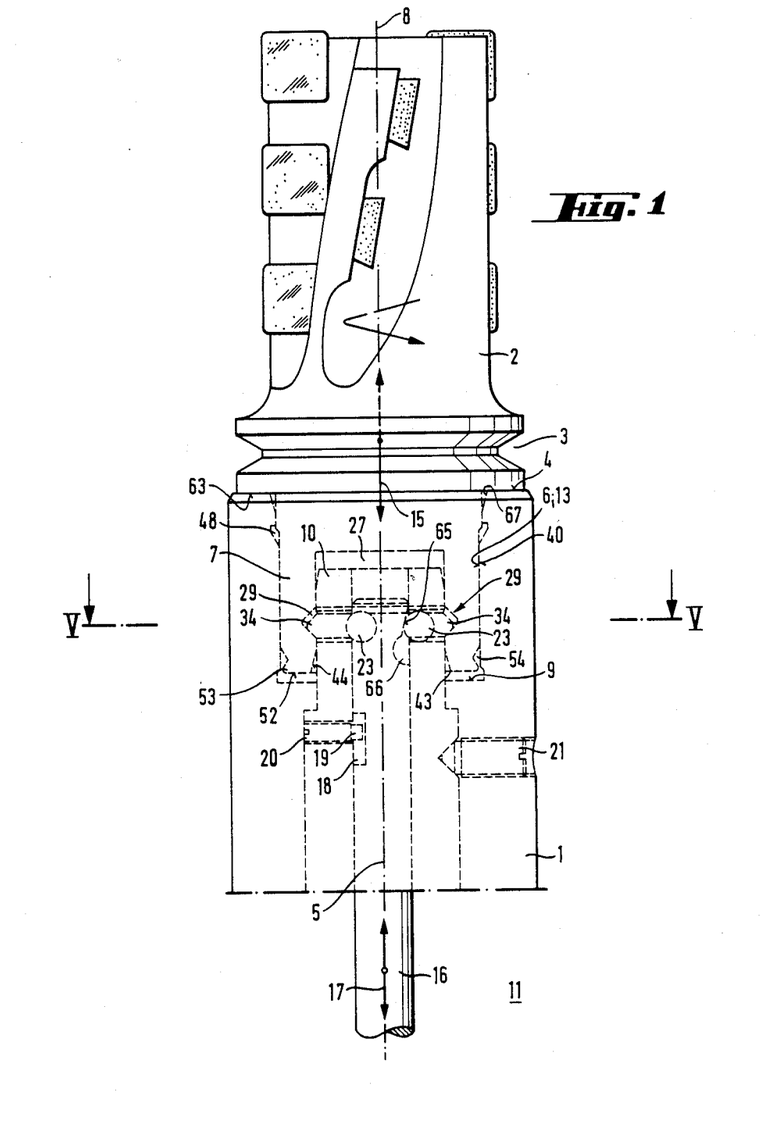
FIG. 1 shows a chucking system according to the present invention with a tool head chucked therein, in a diagrammatic side view.
Figure 2:
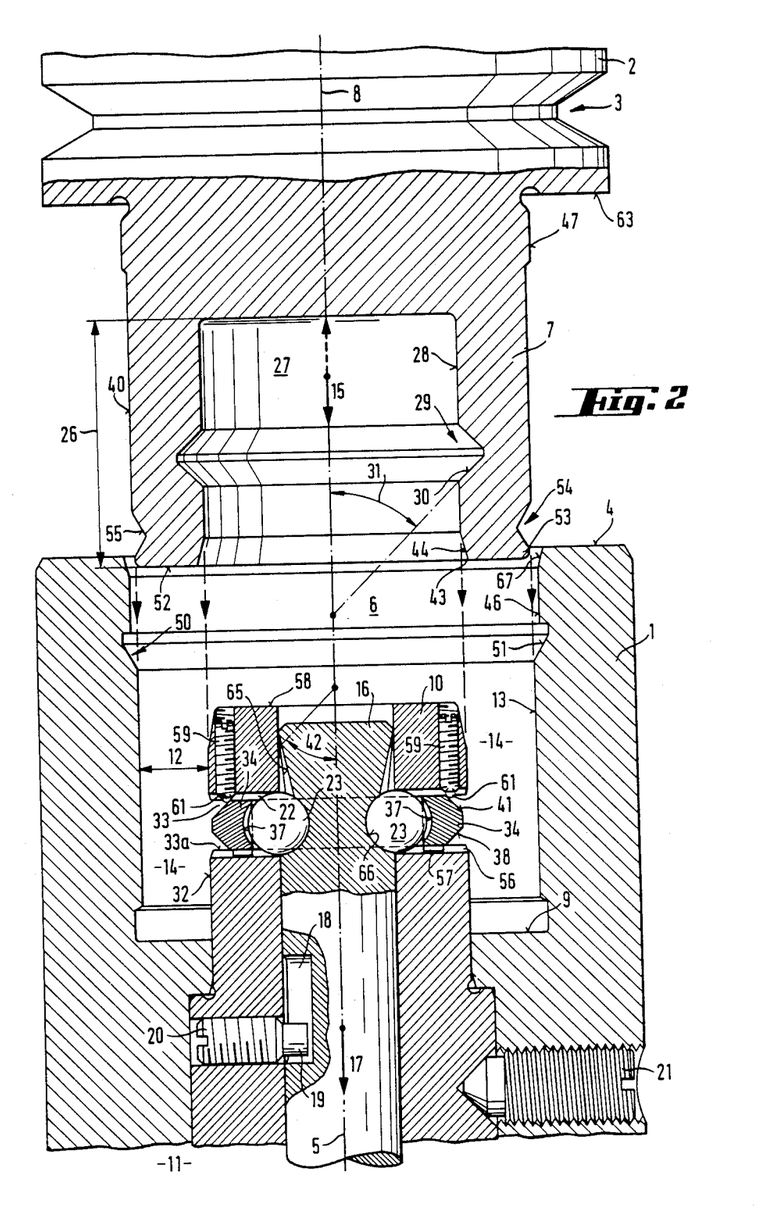
FIG. 2 is an enlarged sectional diagram corresponding to FIG. 1, in which the sectional planes on both sides of the midline axis subtend an angle of 120° with each other as in the section II—II in FIG. 5, and in which the tool head is outside the spindle recess that is intended to accommodate it.

In the embodiment shown in FIG. 1, the tool head 2 is a milling head. The holding or finger groove 3 that surrounds the tool head 2 and which when chucked (FIGS. 1, 4) lies in the vicinity of the unattached end of the drive spindle 1, serves as the point of engagement for a robot arm with which various tool heads are moved to the drive spindle 1 and, when changed, are moved away from this once again. On the face end 4 of the drive spindle there is a recess 6 which is coaxial with the axis 5 of the drive spindle and which is used to accommodate a tool-head shank 7 that protrudes in an axial direction. The axis of rotation of the tool head 2, or the mid-line axis of the machine-tool shank 7 are both numbered 8 (FIG. 2).

A centrally located grip 10 of a chuck unit that can be operated from the machine-tool side 11 projects from the base 9 of the recess 6 that is in the form of a blind hole. The diameter of the grip 10 is such that the grip is surrounded by an annular space 14 in the recess 6 formed by appropriate clearance 12 from the inner peripheral wall 13 of the recess 6. The shank 7 of the tool head 2 can be introduced into the annular space 14 of the spindle recess 6 in an axial direction, where it can be clamped by the chucking unit.

The grip 10 of the chucking unit supports a spreader 16 that can move in the axial direction 15 of the drive spindle 1. The chucking system of the spreader 16 is numbered 17. The release system is oriented in the opposite direction. At its free end, the spreader has a longitudinal groove 18 in which the inserted end 19 of a grub screw 20 that is screwed radially into the grip 10 engages. This means that the spreader 16 is held within the grip 10 so as to be unable to rotate. The grip 10 is installed in the drive signals 1 as an independent unit and is held in its working position by means of a locking screw 21.

Figure 5:
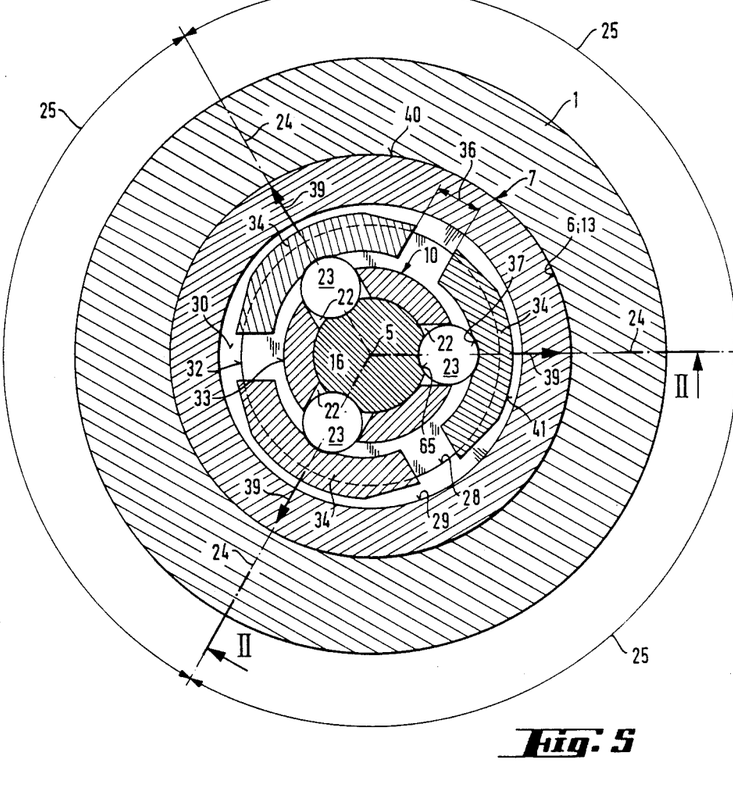
FIG. 5 is a cross section corresponding to the section plane V—V in FIGS. 1 and 4.

Radial guide drillings 22 pass through the axial area of the grip 10 that is located within the recess 6 and a locking ball 23 is accommodated within each such drilling. A total of three such locking balls 23 and three corresponding guide drillings 22 are spaced equidistantly around the periphery of the grip 10. The adjacent axes of the guide drillings 22 thus subtend an angle of 25 of 120° with each other (FIG. 5).

The lock balls 23 are forced radially outwards away from each other by an axial pull on the spreader 16 in the locking direction 17. Thus, they clamp the tool head 2 on the drive spindle 1, as is described in greater detail below.

In its free end area 26, the tool shank 7 is configured as a tubular body or a cylinder that is concentric to the axis of rotation 8, the inner space 27 of which is enclosed by an inner cylindrical surface 28. An interior annular groove 29 that is also concentric with the axis of rotation 8 is also located in the interior cylindrical surface 28 and the machine-tool side of this groove has a groove side wall 30 that is inclined in the manner of an interior cone. The side wall 30 of this groove subtends an acute angle with the axis of rotation 8 or the axis 5 of the drive spindle, said angle closing in the locking direction 17.

Figure 6:
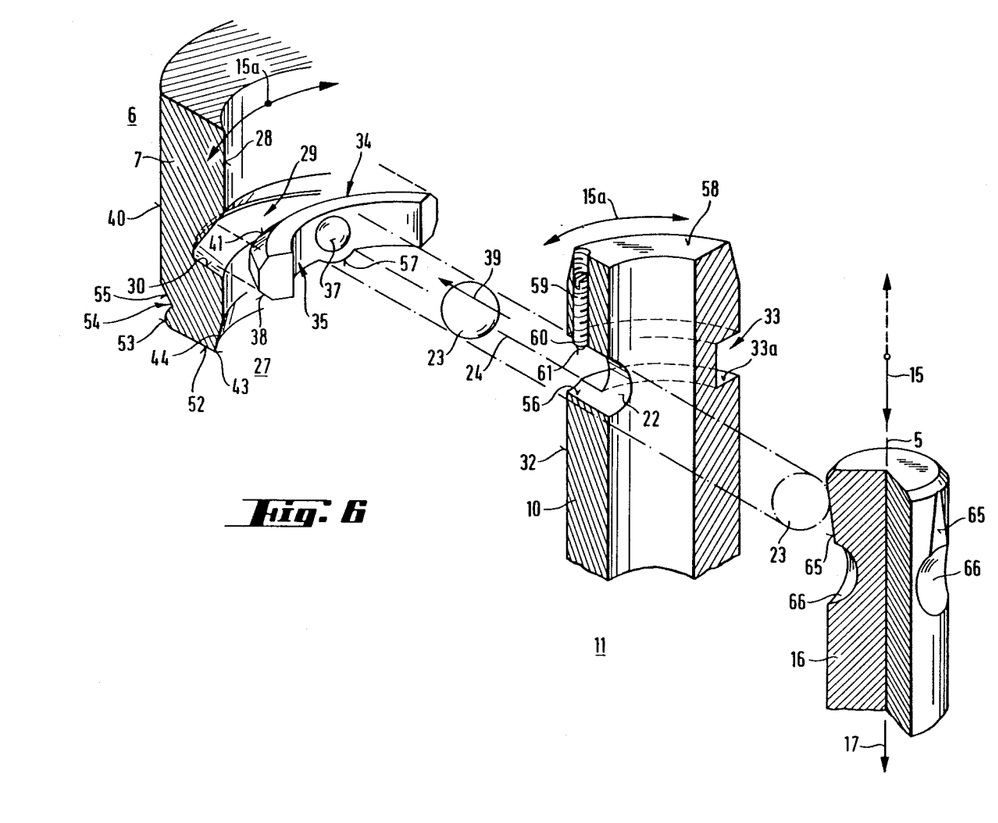
FIG. 6 is a perspective exploded view with a part of the tubular end of the tool-head shaft, a locking element, a lock ball, the associated segment of the grip, and the locking area of the spreader.

On the level of the guide drillings 22 there is an annular groove 33 in the peripheral surface of the grip 10 and three locking elements 34 are located in this; these locking elements cannot move in the axial direction 15 and in the peripheral direction 15a (FIG. 6) but they can be spread apart radially. A lock ball 23 acts on each locking element 34, on its inner side 35. The locking elements 34 are configured as segments of a circle (FIGS. 5, 6). Their ends that face in the peripheral direction 15a are separated by a distance 36. The lock balls 23 engage in the locking elements 34 in an accommodating groove 37 in the inner sides of the locking elements 34. The locking elements 34 work through their locking surfaces 38 that are formed as segments of an exterior cone to generate the chucking pressure on the groove side wall 30 of the inside annular groove 29 of the tool shank 7. When the lock balls 23 are forced apart, the locking elements 34 exert an inner pressure on the tool-head spindle 7, both axially in the locking direction 17 and radially inward in the direction of spread 39, which then spreads apart elastically and is moved into close contact with the inner peripheral wall 13 of the recess 6. At the same time, the flange surface 63 of the tool head 2 is pressed in an axial direction against the face end 4 of the drive spindle 1.

The outer periphery 40 of the tool head spindle 7 is configured as a machined cylindrical journal that is a sliding fit in the recess 6, in the form of a cylindrical drilling, in the drive spindle 1. Each of the locking elements 34 has on its side that is remote from the locking surface 38 a chamfer surface 41 that is in the form of a segment of a cone, and this subtends an acute angle 42 with the axis of rotation 8 or the axis of rotation 5 of the spindle, said angle closing towards the tool head 2.

The edge of the opening 43 of the interior space 27 of the tool-head shank 2 has a chamfer 44.

The front edge area of the recess 6 that is adjacent to the face side 4 of the drive spindle 1 is configured as a cylindrical ring step 45. The cylindrical ring step 45 has an inside diameter that is greater than the inside diameter of the inside peripheral wall 13 of the recess 6 in its area that is closer to the base 9. The inside peripheral wall of the cylinder ring step 45 is a precise seat for a corresponding annular projection 47 of the tool-head shank 7. The annular projection 47 of the tool-head shank 7 is arranged outside the tubular end area of the tool-head shaft 7. When installed (FIGS. 3, 4), the annular projection 47 of the tool-head shank 7 ends to form a free space 48 at an axial distance 49 in front of the face 50 of the cylinder ring step 45.

Between the inside peripheral wall 46 of the annular ring 45 and the inside peripheral wall 13 of the recess 6 of the drive spindle 1 there is a transitional annular surface 51 in the form of an inside cone, which acts as an insertion chamfer. An annular bead 53 is formed on the face end 52 of the tool-head shank 7, and the outside diameter of this is smaller than the outside diameter of the outer periphery 40 of the tool-head shank 7. The periphery of the annular bead 53 is separated from the outer periphery of the tool-head shank 7 by an annular groove 54. The sloping side 55 of the annular groove 54 that makes a transition to become the outer periphery 40 of the tool-head shaft 7 has the peripheral shape of a truncated cone.

When not spread apart, which is to say, when in their rest position (FIG. 2), the locking elements 34 do not project beyond the peripheral surface 32 of the grip 10.

The locking elements 34 have an axial extension 57 that fits in a guide 56, which is directed radially outwards, on the lower side wall 33a of the annular groove 33, so as to ensure that the locking elements move only radially back and forth in the direction of spreading 39.

On the grip 10 there is a limiting system to restrict the radial displacement of the locking elements 34 in the direction of spread 39. This consists of set screws 59 that are screwed in from the face side 58 of the grip 10, the front ends 60 of which can be screwed through the upper side wall of the annular groove 33 of the grip 10 and which extend into the path of the radial displacement of the locking elements 34. The front ends 60 of the set screws 59 are formed by balls 61 that are spring-loaded in the direction of insertion (the locking direction 17).

When the tool-head 2 is in the released position and the locking elements 34 are consequently in the rest position (FIG. 2), these balls react with the chamfers 41 of the locking elements 34 in the manner of a ball-detent system.

Figure 3:
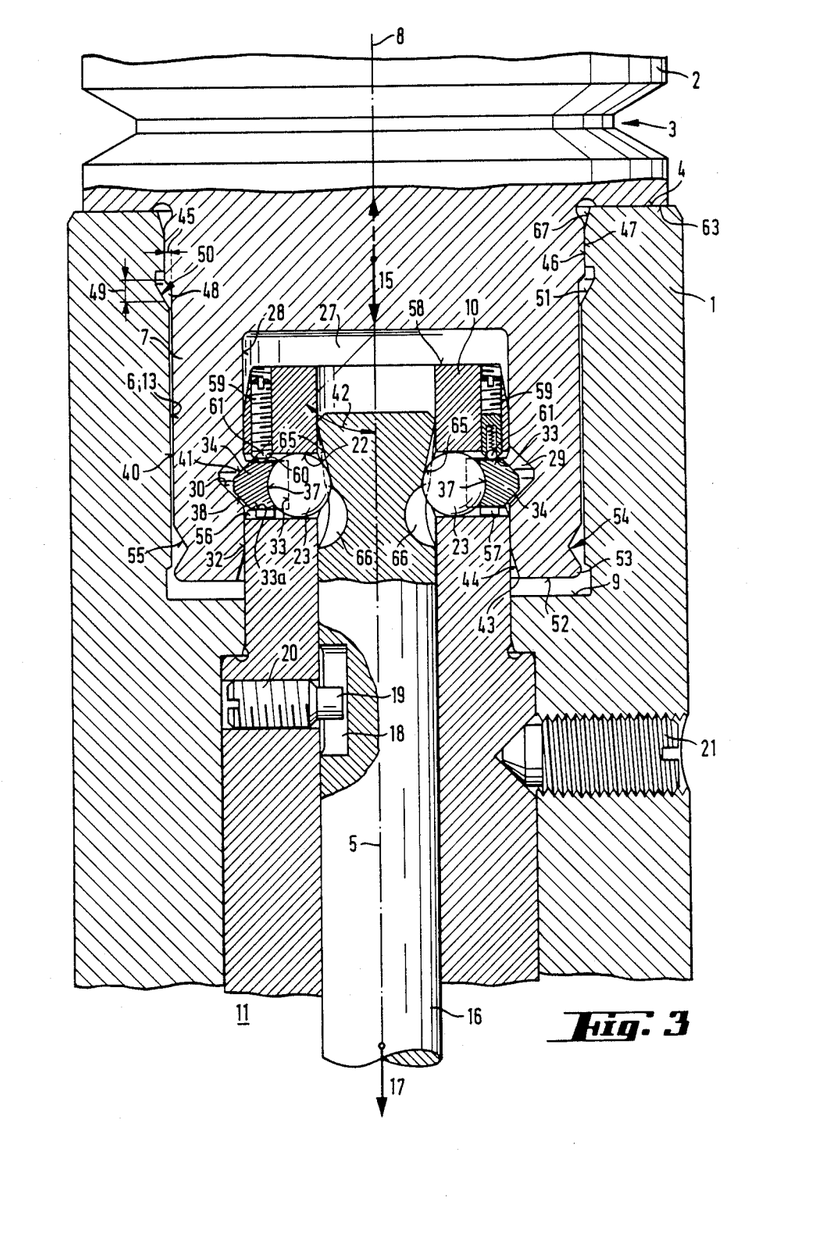
FIG. 3 is a diagram as in FIG. 2, in which the tool head shank is inserted completely into the spindle recess at the start of the actual chucking.
Figure 4:
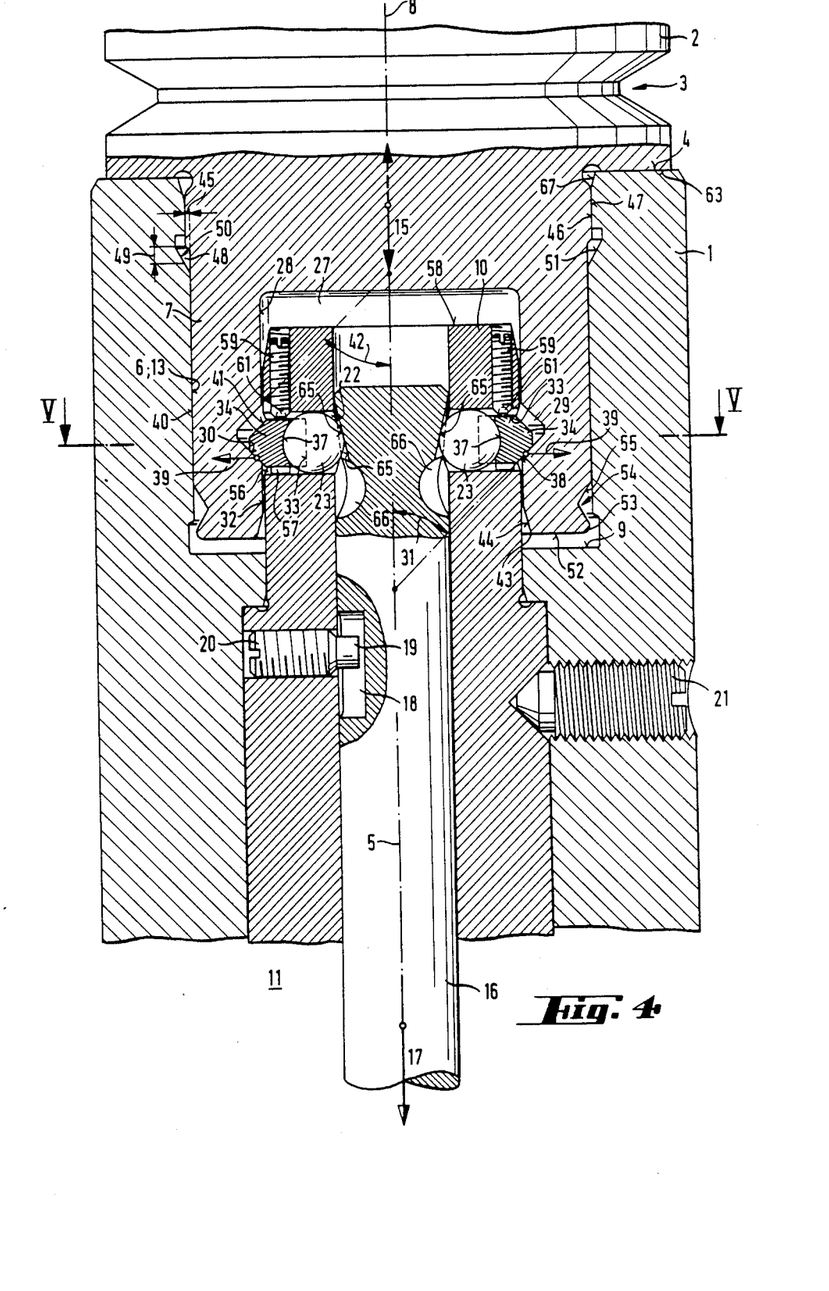
FIG. 4 is a diagram corresponding to FIGS. 2 and 3, in the end chucking position.
Figure 7:
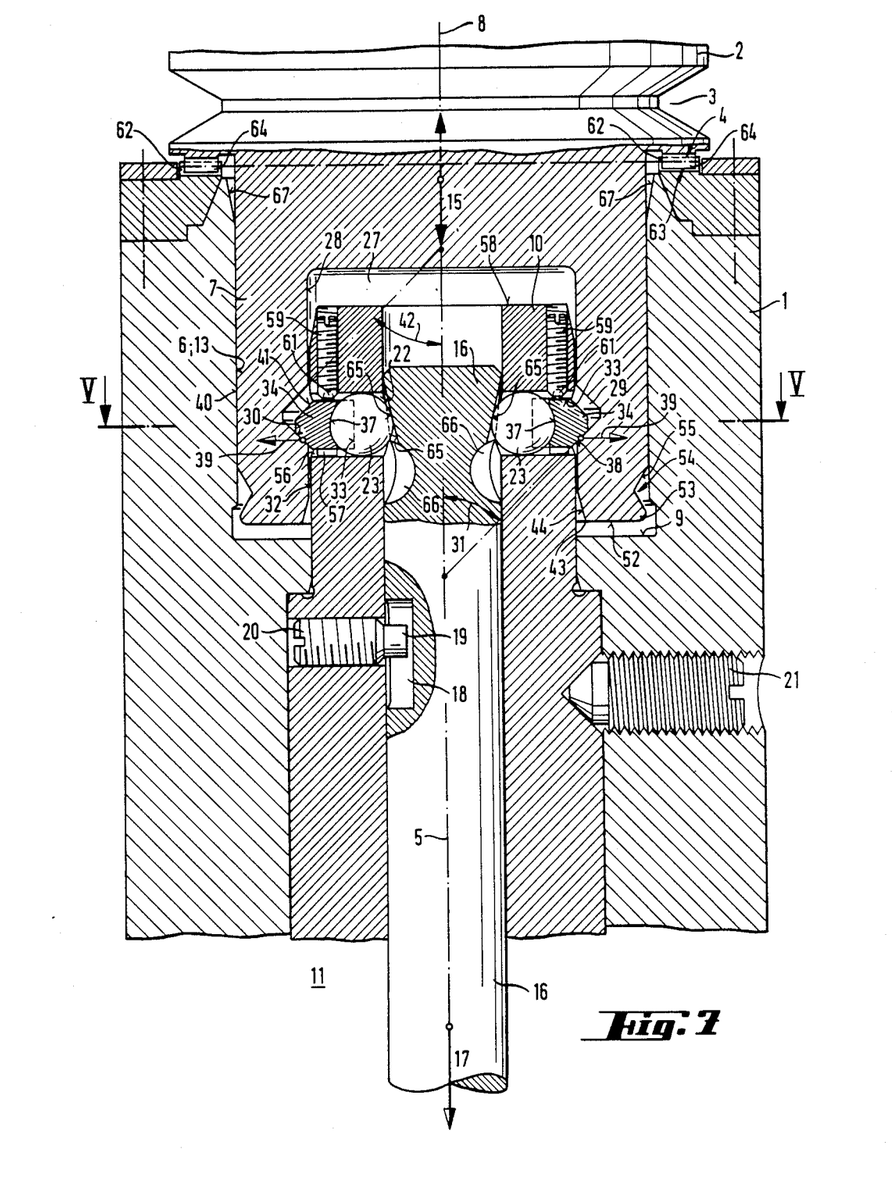
FIG. 7 is a variation of the embodiment shown in FIGS. 1 to 4, in which in place of the separate ring step intended for purposes of fit in the area of the open end of the spindle recess or an annular projection of the tool-head shank, Hirth-type serrations are used between the face contact surfaces of the drive spindle and the tool head so as to provide additional centering and to transmit torque.

In the modified embodiment as in FIG. 7, the face end 4 of the drive spindle 1 is provided with Hirth-type serrations 62 that engage with mating Hirth-type serrations 64 in the mating surface 63 of the tool head 2 in the inserted or locked position (FIGS. 3, 4). In this embodiment, the Hirth-type serrations 62, 64 effect the precision centering of the tool head 2 relative to the drive spindle 1, so that there need be no precision centering by the annular step 45 and the annular projection 47 at that point. There is a chamber 67 at the upper, tool-side edge of the recess 6.

In the embodiments shown herein there are three separate locking elements 34. However, these can be combined to form a one-piece locking ring that is open at one side and can spread apart radially, which is installed in an annular groove 33 that surrounds the grip 10; this is not shown in the drawings, but its direct effect corresponds to the locking ring of the embodiment shown in FIGS. 1 and 3 of U.S. Pat. No. 4,740,122.

At the free, upper end of the spreader 16 there are approximately conical surfaces 65 formed in the direction of pull 7 of the axis of rotation 5 of the spindle. Adjacent to the lower end of the conical surfaces 65 there are detent grooves 66 that accommodate the lock balls 23 in the rest position.

The starting position for chucking the tool head 2 on the drive spindle 1 is shown in FIG. 2. First, the shank 7 of the tool head 2 is slid into the recess 6 of the drive spindle 1 until the face-end matching surface 63 of the tool head 2 comes to rest against the face side 4 of the drive spindle 1. This is the starting position for the chucking phase. In this initial or starting position the spreader 16 is drawn in the locking direction 17. When this is done, the lock balls 23 move out of the detent groove 66 of the spreader 16. The periphery of the locking cone surfaces 65 forces them apart in the direction of spread 39. The starting position for the spreading phase is shown in figure 3. As the pulling movement of the spreader 16 continues in the direction of locking 17, the locking elements 34, of which the inner sides 35 are acted upon by the lock balls 23, are also forced in the locking direction 39. When this happens, their locking surfaces 38 rest on the groove side wall 30 of the inside annular groove 29 of the tool-head shank 7, when they exert an internal pressure on the tool-head shank 7, which works both axially in the locking direction 17 and radially in the direction of spread 39. Because of the spreading pressure exerted in the direction of spread 39 the end area of the tool-head shank 7 is expanded slightly outwards into the vicinity of the inside annular groove 29. This expansion is in the range of elastic deformity. Because of the relatively narrow fit between the outside periphery 40 of the tool-head shank 7 and the inside peripheral wall 13 of the recess 6 of the drive spindle 1, however, this expansion is sufficient to create a firm force-locking fit between the tool-head shank 7 and the drive spindle 1. This brings about a precise fit by the interaction of the annular step 45 and the annular projection 47 of the drive spindle 1 and the tool head 2 (FIGS. 1 to 6). In the modified embodiment shown in FIG. 7, this precise centering is effected by the interaction of the Hirth-type serrations 62, 64.

In order to release the chucking system the spreader 16 is moved counter to its locking direction 17 in an axial direction 15 until the lock balls 23 once again lie in the detent grooves 66 at the upper end of the spreader 16, which marks the rest position of the chucking system. After or even during this forward movement of the spreader 16 the tool head 2 is withdrawn against the direction of locking 17 by a robot arm that engages in the holding groove 3. When this is done, the side wall of the groove 30 of the inside annular groove 29 forces the locking elements 34 radially inward through the locking surfaces 38 until the locking elements 34 no longer project beyond the peripheral surface 32 of the grip 10 and no longer prevent the complete withdrawal of the took-head shank 7 thereby. In this position, the balls 61 of the set screws 59 act on the chamfer surfaces 41 of the locking elements 34 in the manner of a ball-detent lock. They thus hold the locking elements 34 securely in their rest position even though the drive spindle 1 rotates when in this position and, as a result, centrifugal forces act on the locking elements 34. When the tool-head shank 7 is withdrawn from the recess 6 of the drive spindle 1 the recess 6 is available to accommodate a new tool head 2 that is fitted with another tool. The chucking process then starts again, as has been described above. The tool-head change cycle is concluded thereby.

I claim:

1. An apparatus for changing and chucking a tool head to the drive spindle of a machine tool, with a recess provided in the face of the drive spindle, which is coaxial with the axis of rotation of the drive spindle, to accommodate a shaft of the tool head that projects in an axial direction, and with a gripper of a chucking system that can be operated from the machine-tool side, which projects centrally from the base of the recess and that has an annular space around it within the recess formed by appropriate clearance to the inner peripheral wall of the recess, the shaft of the tool head being insertable into the annular space of the spindle recess, where it can be clamped by the chucking unit, and the gripper of the chucking unit supporting a spreader that can be moved axially in the direction of the drive spindle and through which there are radial guide drillings, within each of which there is a lock ball, it being possible to spread these apart, radially outwards by an axial pull on the spreader and which tighten the tool head thereby, wherein (a) the tool-head shank is configured as a tubular body, at least in its free end area, and has an inside annular groove on its inner annular surface, which, on its machine-tool side has a groove side wall that is inclined in the manner of an inside cone and subtends an acute angle that closes in the locking direction with the axis of the drive spindle, (b) locking elements are set in the peripheral surface of the gripper, which cannot be moved in the axial direction, but which can be forced apart in the radial direction, these elements having locking surfaces that are shaped to correspond to the inside-cone shaped groove side wall of the inside annular groove as segments of an exterior cone, and (c) the lock balls engage a sloped surface on the inner side of a locking element such that when the lock balls are forced apart the lock elements exert both an axial inner pressure in the locking direction and a radial inner pressure in the direction of spread on the tool-head shank.

2. An apparatus as claimed in claim 1, wherein the outer periphery of the tool-head shank is formed as a cylindrical precision-fitted journal that can be inserted so as to produce a sliding fit into the recess of the drive spindle that is formed as a cylindrical drilled hole.

3. An apparatus as claimed in claim 1, wherein each of the locking elements has on it a side that is remote from the locking surfaces a chamfer, these being shaped like a segment of a cone and subtending an angle that closes in the direction of the tool head with the axis of the drive spindle.

4. An apparatus as claimed in claim 1, wherein the opening edge of the inside space of the tool-head shank has an inclined chamfer.

5. An apparatus as claimed in claim 1, wherein a ring step borders the face of the drive spindle and forms the front area of its recess, this being of greater inside diameter than the inside diameter of the inside peripheral wall of the recess, the inner peripheral wall of the ring step being a fitted seat for an inner annular projection of the tool-head shank.

6. An apparatus as claimed in claim 5, wherein the annular projection of the tool-head shank is arranged outside the tubular end area of the tool-head shank.

7. An apparatus as claimed in claim 5, wherein the annular projection of the tool-head shank ends when in the inserted position to form a space that is axially separated from the face surface of the ring step.

8. An apparatus as claimed in claim 1, comprising an annular transition surface that functions as an insertion surface between the inside peripheral wall of the ring step and the inner peripheral wall of the recess of the drive spindle.

9. An apparatus as claimed in claim 1, comprising an annular bead formed at the face end of the tool-head shank, the outside diameter of which is smaller than the outside periphery of the tool-head shank, and the periphery of which is separated from the outside periphery of the tool-head shank by an annular bead.

10. An apparatus as claimed in claim 1, wherein the sloped side of the annular groove that makes the transition to the outer periphery of the tool-head shank has the peripheral shape of a truncated cone.

11. An apparatus as claimed in claim 1, wherein the locking elements lie in an annular groove in the peripheral surface of the gripper and in their rest position, when not spread apart, do not project beyond the peripheral surface.

12. An apparatus as claimed in claim 11, comprising at least one axial extension that is formed on the locking elements that engages in a guide on the side wall of the annular groove that is directed radially outwards.

13. An apparatus as claimed in claim 11, comprising a limiting system arranged on the grip and limiting the radial travel of the locking elements in the direction of spread.

14. An apparatus as claimed in claim 13, wherein set screws that are screwed in from the face end of the grip can be screwed in so that their front ends pass through a side wall of the annular groove of the grip and project into the radial path of the locking elements.

15. An apparatus as claimed in claim 14, wherein the front ends of the screws are formed by balls that are spring loaded in the direction of insertion, and act on the chamfer surfaces of the locking elements in the manner of a ball-type detent.

16. An apparatus as claimed in claim 1 to, wherein the face of the drive spindle is provided with Hirth-type serrations into which fit matching Hirth-type serrations on the matching surface of the tool head.

17. An apparatus as claimed in claim 1, wherein the locking elements are combined into a one-piece, radially spreadable lock ring that is open at one side and which lies in the annular groove that surrounds the gripper.

18. An apparatus as claimed in claim 1, wherein the lock balls act on the locking elements in an accommodating groove in their inner sides.

19. An apparatus as claimed in claim 1, wherein the free end of the spreader is configured as a locking cone that closes in the direction of pull; and wherein detent grooves that are adjacent to the inner end of the locking cone and accommodate the lock balls when they are in their rest position are arranged on the periphery of the spreader.

* * * * *